(12) United States Patent
Zou et al.

(10) Patent No.: US 12,499,595 B2
(45) Date of Patent: Dec. 16, 2025

(54) METHOD AND SYSTEM OF FLUORESCENCE MOLECULAR TOMOGRAPHY BASED ON WAVELET AND SCHUR DECOMPOSITION

(71) Applicant: SOOCHOW UNIVERSITY, Suzhou (CN)

(72) Inventors: Wei Zou, Suzhou (CN); Jiajun Wang, Suzhou (CN); Erxi Fang, Suzhou (CN); Danfeng Hu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 316 days.

(21) Appl. No.: 18/195,467

(22) Filed: May 10, 2023

(65) Prior Publication Data

US 2023/0316600 A1  Oct. 5, 2023

Related U.S. Application Data

(63) Continuation of application No. PCT/CN2022/076032, filed on Feb. 11, 2022.

(30) Foreign Application Priority Data

Jan. 7, 2022  (CN) .......................... 202210018190.4

(51) Int. Cl.
*G06T 11/00*  (2006.01)

(52) U.S. Cl.
CPC ....... *G06T 11/006* (2013.01); *G06T 2211/424* (2013.01)

(58) Field of Classification Search
CPC .. G06T 11/006; G06T 2211/424; G06F 17/12; G06F 17/148; G06F 17/16

(Continued)

(56) References Cited

U.S. PATENT DOCUMENTS 6,493,849 B1 * 12/2002 Telichevesky ........ G06F 30/367
                                                           703/2
2007/0286468 A1   12/2007 Joshi et al.
2015/0348258 A1 * 12/2015 Petschke ................ A61B 6/032
                                                           378/19

FOREIGN PATENT DOCUMENTS

CN         109087372 A     12/2018

OTHER PUBLICATIONS

Wei Zhou, "Study of Reconstruction Technologies for Fluorescent Molecular Tomography" Doctoral Thesis, Soochow University (Jan. 15, 2012).

(Continued)

*Primary Examiner* — Amandeep Saini
(74) *Attorney, Agent, or Firm* — SZDC Law PC

(57) ABSTRACT

The present invention discloses a reconstruction method and system of fluorescence molecular tomography based on wavelet and Schur decomposition, the method including the steps of: transforming the inverse problem of fluorescence molecular tomography into a linear matrix equation; solving the linear matrix equation and updating reconstruction parameters iteratively using the obtained solution to obtain a final reconstruction result; in which, in the process of solution of the linear matrix equation, wavelet transform is performed on the linear matrix equation to obtain an overview matrix equation, Schur decomposition is performed on the overview matrix equation to obtain a subsystem with a reduced number of conditions, and the linear matrix equation is calculated using the solution of the subsystem. The present invention reduces the amount of calculation in the process of reconstruction, speedups the process of reconstruction, improves the imaging efficiency and further improves the imaging quality.

10 Claims, 3 Drawing Sheets

(58) Field of Classification Search
USPC .......................................................... 382/100
See application file for complete search history.

(56) References Cited

OTHER PUBLICATIONS

Tony F Chan et al., "On Two Variants of an Algebraic Wavelet Preconditioner" SIAM J. Sci. Comput. vol. 24, No. 1, pp. 260-283 (Jun. 18, 2002).

Wei Zou et al., "A Wavelet-Based Multiresolution Reconstruction Method for Fluorescent Molecular Tomography" International Journal of Biomedical Imaging, vol. 2009, Article ID 294545, 11 pages (Jul. 22, 2009).

Wei Zou et al., "Image reconstruction of fluorescent molecular tomography based on the tree structured Schur complement decomposition" BioMedical Engineering OnLine 2010, 9:20 (May 20, 2010).

* cited by examiner (a)             (b)

(a)  (b)

METHOD AND SYSTEM OF FLUORESCENCE MOLECULAR TOMOGRAPHY BASED ON WAVELET AND SCHUR DECOMPOSITION

This application is a Continuation Application of PCT/CN2022/076032, filed on Feb. 11, 2022, which claims priority to Chinese Patent Application No. 202210018190.4, filed on Jan. 7, 2022, which is incorporated by reference for all purposes as if fully set forth herein.

FIELD OF THE INVENTION

The present invention relates to the technical field of image processing, and more particularly to a reconstruction method and system of fluorescence molecular tomography based on wavelet and Schur decomposition.

DESCRIPTION OF THE RELATED ART

Fluorescence molecular tomography is an important imaging technology which uses a fluorescent contrast agent to image biological tissues with improved specificity and contrast and is widely used in the medical field. Therefore, it attracts more and more attention. In addition, fluorescence molecular tomography can be used to study the disease progression and evaluate the therapeutic effect.

Fluorescence molecular tomography includes forward and inverse problems. The forward problem is to calculate measurements of the tissue boundary under a given model where the light source distribution on the surface of the tissue and the spatial distribution of the optical parameters inside the tissue are already known. The inverse problem is to reconstruct the spatial distribution of optical parameters inside the tissue based on a set of boundary measurements and a photon transmission model. The process of solving the inverse problem often involves large-scale matrix calculation [1,2]. First, the expression of the forward problem is expanded by Taylor series, and then the terms of second order and higher order after the second-order are ignored. Then, the inverse problem can be expressed as a linear matrix equation, and the whole reconstruction problem is transformed into solution of the matrix equation. At present, the matrix equation is usually calculated by direct solution. The final reconstruction result is obtained by continued iteration of reconstruction parameters.

However, with the increase of reconstruction scale, the amount of calculation of the matrix equation will also increase, which will affect the reconstruction speed of the whole fluorescence molecular tomography. Therefore, with regard to large-scale reconstruction problems, the method of direct solution of matrix equations has become a constraint factor in further improvement of the reconstruction speed. The essential problem in speed-up of fluorescence molecular tomography reconstruction is to avoid direct solution of large-scale matrix equations.

References in the present invention:
[1] C. Darne, Y. Lu, and E. M. Sevick-Muraca, "Small animal fluorescence and bioluminescence tomography: a review of approaches, algorithms and technology update," Phys. Med. Biol. 59 (1), R1-R64 (2014).
[2] H. Yang, X. Dai, and H. Jiang, "Full density fluorescence molecular tomography (FD-FMT) based on a dichroic mirror," Appl. Optics 57 (27), 7938-7941 (2018).

SUMMARY OF THE INVENTION

It is an object of the present invention to provide a reconstruction method and system of fluorescence molecular tomography based on wavelet and Schur decomposition that can reduce the amount of calculation in the process of reconstruction, speed up the process of reconstruction, improve the imaging efficiency, and further improve the imaging quality.

To solve the technical problem mentioned above, the present invention provides a reconstruction method and system of fluorescence molecular tomography based on wavelet and Schur decomposition, including the steps of:

transforming the inverse problem in fluorescence molecular tomography into a linear matrix equation;

solving the linear matrix equation and updating reconstruction parameters iteratively using the obtained solution to obtain a final reconstruction result;

in which, in the process of solution of the linear matrix equation, wavelet transform is performed on the linear matrix equation to obtain an overview matrix equation, Schur decomposition is performed on the overview matrix equation to obtain a subsystem with a reduced number of conditions, and the linear matrix equation is calculated using the solution of the subsystem.

As a further improvement of the present invention, the solving the linear matrix equation specifically includes the following steps:

S01: for the linear matrix equation $K\Delta x = b$, calculating the matrices K and b;

S02: performing wavelet transform on $K\Delta x = b$ to obtain an overview matrix equation $\hat{K}_a \Delta \hat{x}_a = \hat{b}_a$, where $\hat{K} = W_b K W_x^T$, $\hat{b} = W_b b$, and $\Delta \hat{x} = W_x \Delta x$, $W_b$ and $W_x$ being wavelet transform matrices for b and $\Delta x$ respectively;

S03: performing Schur decomposition on $\hat{K}_a \Delta \hat{x}_a = \hat{b}_a$, and letting the i-th level subsystem after decomposition be $\tilde{K}_{a(i,j)} \Delta \tilde{x}_{a(i,j)} = \tilde{b}_{a(i,j)}$, where $\tilde{K}_{a(i,j)}$ and $\tilde{b}_{a(i,j)}$ represent the j-th term at the i-th level in Schur decomposition;

S04: letting $i = R-1$ and letting $j = 1, 2, \ldots, 2^i$ and cyclically solving the equations $\tilde{K}_{a(i+1,2j)} \Delta \tilde{x}_{a(i+1,2j)} = \tilde{b}_{a(i+1,2j)}$ and $\tilde{K}_{a(i+1,2j-1)} \Delta \tilde{x}_{a(i+1,2j-1)} = \tilde{b}_{a(i+1,2j-1)}$, R representing the level number of decomposition; letting $i = R-1, \ldots, 1, 0$ and $j = 1, 2, \ldots, 2^i$ and cyclically solving the equation $\Delta \tilde{x}_{a(i,j)} = \Gamma_{(i,j)} \Delta \tilde{x}_{a(i+1,2j-1)} + \Psi_{(i,j)} \Delta \tilde{x}_{a(i+1,2j)}$ to obtain the solution $\Delta \tilde{x}_{a(i,j)}$; and S05: performing zero-fill extension on $\Delta \tilde{x}_{a(0,1)}$ to obtain an initial solution, i.e., $$\Delta \hat{x}^{(0)} = \left[ \Delta \tilde{x}_{a(0,1)}^T, 0^T \right]^T$$

and calculating the equation $K\Delta x = b$ by using the initial solution $\Delta x^{(0)} = W_x^T \Delta \hat{x}^{(0)}$ to obtain the solution $\Delta x$.

As a further improvement of the present invention, in the Step S01, the matrices K and b are calculated based on $K = (J^T J + \lambda I)$ and $b = J^T \Delta y$, where $\lambda$ represents the regularization parameter, I represents the identity matrix, $\Delta y$ represents the residual between the predicted value and the measured value and J represents the sensitivity matrix:

$$J = \begin{bmatrix} \dfrac{\partial y_1}{\partial x_1} & \cdots & \dfrac{\partial y_1}{\partial x_N} \\ \vdots & \ddots & \vdots \\ \dfrac{\partial y_M}{\partial x_1} & \cdots & \dfrac{\partial y_M}{\partial x_N} \end{bmatrix}.$$

As a further improvement of the present invention, in the Step S04, $\Delta \tilde{\hat{x}}_{a(i+1,2j-1)}$ and $\Delta \tilde{\hat{x}}_{a(i+1,2j)}$ are respectively the projection of $\Delta \tilde{\hat{x}}_{a(i,j)}$ in two subspaces, the base of which consists of the column vectors of $\Gamma_{(i,j)}$ and $\Psi_{(i,j)}$ respectively, where $\tilde{K}_{a(i+1,2j)} = \tilde{K}_{a(i,j)22} - \tilde{K}_{a(i,j)21}\tilde{K}_{a(i,j)11}^{-1}\tilde{K}_{a(i,j)12}$, $\tilde{K}_{a(i,j)11} = \Gamma_{(i,j)}^T \tilde{K}_{a(i,j)} \Gamma_{(i,j)}$, $\tilde{K}_{a(i,j)12} = \Gamma_{(i,j)}^T \tilde{K}_{a(i,j)} \Psi_{(i,j)}$, $\tilde{K}_{a(i,j)21} = \Psi_{(i,j)}^T \tilde{K}_{a(i,j)} \Gamma_{(i,j)}$, $\tilde{K}_{a(i,j)22} = \Gamma_{(i,j)}^T \tilde{K}_{a(i,j)} \Psi_{(i,j)}$, $\tilde{b}_{a(i+1,2j)} = \Psi_{(i,j)}^T \tilde{b}_{a(i,j)} - \tilde{K}_{a(i,j)21}\tilde{K}_{a(i,j)11}^{-1} \Gamma_{(i,j)}^T \tilde{b}_{a(i,j)}$, $\tilde{K}_{a(i+1,2j-1)} = \tilde{K}_{a(i,j)11} - \tilde{K}_{a(i,j)12}\tilde{K}_{a(i,j)22}^{-1}\tilde{K}_{a(i,j)21}$, and $\tilde{b}_{a(i+1,2j-1)} = \Gamma_{(i,j)}^T \tilde{b}_{a(i,j)} - \tilde{K}_{a(i,j)12}\tilde{K}_{a(i,j)22}^{-1} \Gamma_{(i,j)}^T \tilde{b}_{a(i,j)}$. As a further improvement of the present invention, iterative update is made to the reconstruction parameters by using the obtained solution, that is, iterative calculation is made to the absorption coefficient to be reconstructed x, i.e., $X=x+\Delta x$.

As a further improvement of the present invention, predicted photon density $\Phi_m(x)$ is obtained based on a forward model and an objective function $\psi(x)=\|y-\Phi_m(x)\|$ is created, where y represents the measurement data, and the objective function value is calculated; and if the objective function value is greater than a preset threshold $\varepsilon$, then solution of the linear matrix equation is continued; otherwise the iterative update is ended and the final absorption coefficient to be reconstructed x is obtained.

As a further improvement of the present invention, within a finite element frame, the forward model is expressed as the matrix equations $A_e \Phi_e = S_e$ and $A_m \Phi_m = S_m$, where $S_{e,m}$ represents the light source, the stiffness matrices $A_e$ and $A_m$ are calculated according to the formula $$a_{\Omega_h}(u_i, u_j)_{e,m} = \iint_{\Omega_h} D_{e,m} \nabla u_i \cdot \nabla u_j d\Omega + \iint_{\Omega_h} k_{e,m} u_i u_j d\Omega + \int_{\Gamma_h} b_{e,m} u_i u_j ds,$$

where $a_{\Omega_h}(u_i, u_j)$ represents the element in the i-th row and j-th column of the unit stiffness matrix; $\nabla$ represents the gradient, $\Omega_h$ is the imaging area, $\Gamma_h$ is the boundary of the imaging area, $u_i(i=1, \ldots, N)$ is the base function of the space node, N is the number of base functions of the node;

$$D_e = \frac{1}{3(\mu_{aei} + \mu_{aef} + \mu'_{se})}$$

and $$D_m = \frac{1}{3(\mu_{ami} + \mu_{amf} + \mu'_{sm})}$$

represent the diffusion coefficients, the subscript e represents the excitation light, the subscript m represents the fluorescent light;

$$k_e = \frac{i\omega}{c} + \mu_{aei} + \mu_{aef}$$

and $$k_m = \frac{i\omega}{c} + \mu_{ami} + \mu_{amf}$$

represent the decay coefficients, $b_e$ and $b_m$ represent the Robin boundary coefficients; $\mu_{aei}$ and $\mu_{ami}$ are absorption coefficients of chromatophores, $\mu_{aef}$ and $\mu_{amf}$ are absorption coefficients of fluorophores, $\mu'_{se}$ and $\mu'_{sm}$ are isotropic scattering coefficients, c is the light velocity, $\omega$ represents the angular frequency, and $i=\sqrt{-1}$.

A reconstruction system of fluorescence molecular tomography based on wavelet and Schur decomposition adopts the reconstruction method described above for fluorescence molecular tomography.

An image processing apparatus includes a memory, a processor and a computer grogram stored in the memory and executable on the processor. The processor, when executing the program, performs the steps of the method described above.

A processor is configured to execute a program which, when executed, performs the method described above.

The present invention has the following beneficial effects: according to the present invention, the characteristic of wavelet transform is utilized to mine important information and neglect less important information; with Schur complement decomposition, the resultant subsystem has a reduced number of conditions, so that at given accuracy, the speed of solution of the matrix equation is substantially increased for the system; compared with the method of direct solution of the matrix equation, the method of reconstruction based on wavelet-Schur decomposition can effectively reduce the scale of the matrix of the system, so that the calculation cost for the inverse problem is reduced, which facilities improvement of the reconstruction efficiency of fluorescence molecular tomography, and higher reconstruction accuracy and reconstruction speed can be achieved.

DETAILED DESCRIPTION OF THE PREFERRED EMBODIMENTS

Hereinafter, the present invention will be further explained with reference to the drawings and particular embodiments, so that those skilled in the art can better understand the present invention and implement it. However, the listed embodiments should not be taken as limitation of the present invention.

The present invention provides a reconstruction method of fluorescence molecular tomography based on wavelet and Schur decomposition, including the steps of:
- transforming the inverse problem in fluorescence molecular tomography into a linear matrix equation;
- solving the linear matrix equation and updating reconstruction parameters iteratively using the obtained solution to obtain a final reconstruction result;
- in which, in the process of solution of the linear matrix equation, wavelet transform is performed on the linear matrix equation to obtain an overview matrix equation, Schur decomposition is performed on the overview matrix equation to obtain a subsystem with a reduced number of conditions, and the linear matrix equation is calculated using the solution of the subsystem.

According to the method of the present invention, the characteristic of wavelet transform is utilized to mine important information and neglect less important information; then Schur complement decomposition is performed, and the resultant subsystem has a reduced number of conditions, so that the speed of the overall solution of the matrix equation is significantly increased for the system; the calculation cost for the inverse problem is reduced, so that the problem in calculation of large-scale matrix equations can be effectively overcome, the structure of the target body can be better reconstructed, and the speed and accuracy of fluorescence molecular tomography reconstruction can be effectively improved.

Figure 1:
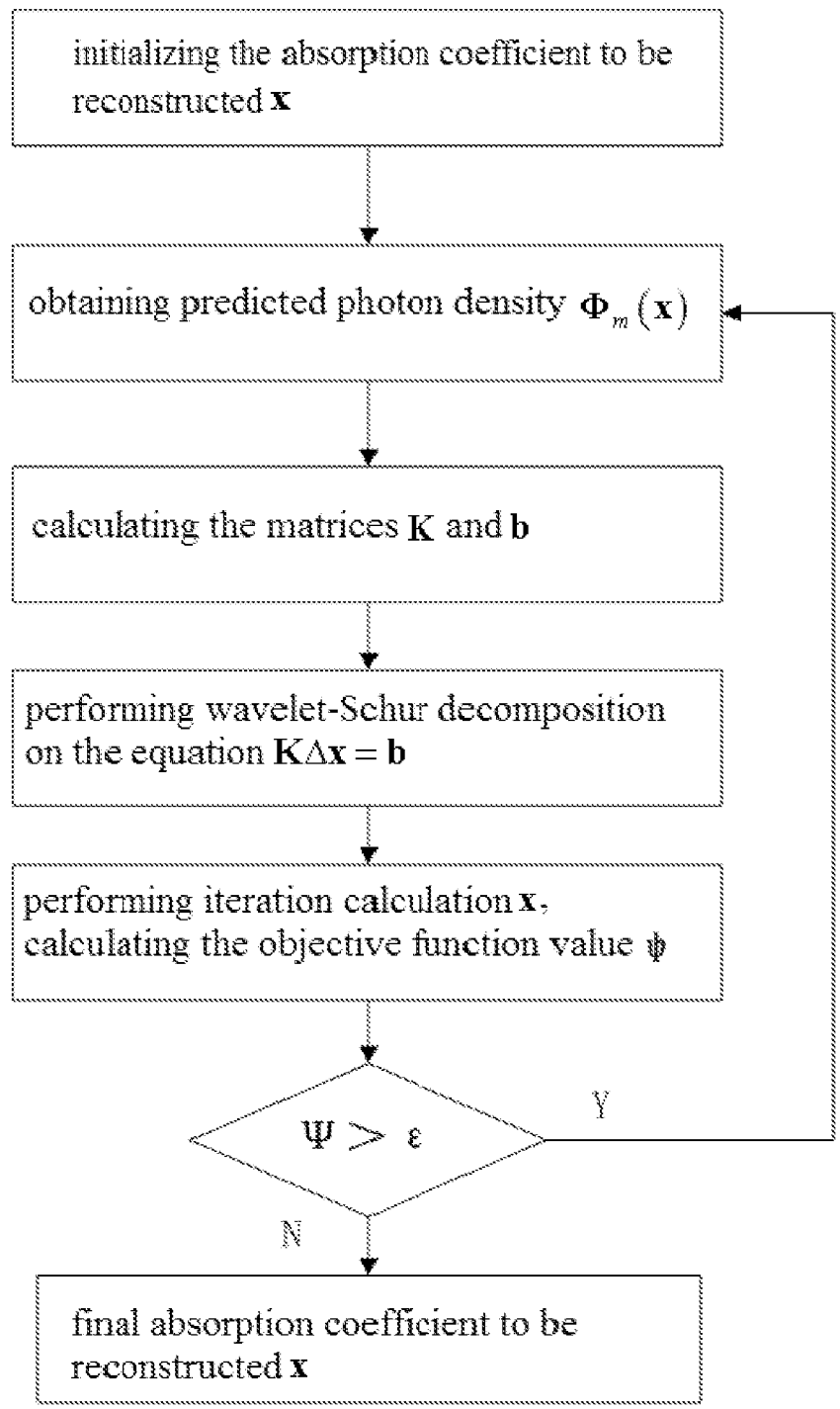
FIG. 1 is a flowchart of implementation of a method according to the present invention.

Specifically, referring to FIG. 1, the following steps are performed in the process of implementation:

1) initializing the absorption coefficient to be reconstructed x.

2) obtaining predicted photon density $\Phi_m(x)$ based on a forward model, in which within a finite element frame, the forward model is expressed as the matrix equations $A_e\Phi_e=S_e$ and $A_m\Phi_m=S_m$, where $S_{e,m}$ represents the light source; and calculating the stiffness matrices $A_e$ and $A_m$ according to the formula $$a_{\Omega_h}(u_i u_j)_{e,m} = \iint_{\Omega_h} D_{e,m} \nabla u_i \cdot \nabla u_j d\Omega + \iint_{\Omega_h} k_{e,m} u_i u_j d\Omega + \int_{\Gamma_h} b_{e,m} u_i u_j ds,$$

where $a_{\Omega_k}(u_i, u_j)$ represents the element in the i-th row and j-th column of the unit stiffness matrix, $\nabla$ represents the gradient, $\Omega_h$ is the imaging area, $\Gamma_h$ is the boundary of the imaging area, $u_i (i=1, \ldots, N)$ is the base function of the space node, N is the number of base functions of the node;

$$D_e = \frac{1}{3(\mu_{aei} + \mu_{aef} + \mu'_{se})}$$

and $$D_m = \frac{1}{3(\mu_{ami} + \mu_{amf} + \mu'_{sm})}$$

represent the diffusion coefficients, the subscript e represents the excitation light, the subscript m represents the fluorescent light;

$$k_e = \frac{i\omega}{c} + \mu_{aei} + \mu_{aef}$$

and $$k_m = \frac{i\omega}{c} + \mu_{ami} + \mu_{amf}$$

represent the decay coefficients, $b_e$ and $b_m$ represent the Robin boundary coefficients; $\mu_{aei}$ and $\mu_{ami}$ are absorption coefficients of chromatophores, $\mu_{aef}$ and $\mu_{amf}$ are absorption coefficients of fluorophores, $\mu'_{se}$ and $\mu'_{sm}$ are isotropic scattering coefficients, c is the light velocity, $\omega$ represents the angular frequency, and $i=\sqrt{-1}$.

3) calculating the matrices K and b based on $K=(J^TJ+\lambda I)$ and $b=J^T\Delta y$, where J represents the sensitivity matrix, $\lambda$ represents the regularization parameter, I represents the identity matrix, $\Delta y$ represents the residual between the predicted value and the measured value and the sensitivity matrix is calculated according to $$J = \begin{bmatrix} \frac{\partial y_1}{\partial x_1} & \cdots & \frac{\partial y_1}{\partial x_N} \\ \vdots & \ddots & \vdots \\ \frac{\partial y_M}{\partial x_1} & \cdots & \frac{\partial y_M}{\partial x_N} \end{bmatrix}.$$

4) performing wavelet transform on the equation $K\Delta x=b$ to obtain overview information, i.e., $\hat{K}_a\Delta\hat{x}_a=\hat{b}_a$, where $\hat{K}=W_b K W_x^T$, $\hat{b}=W_b b$, and $\Delta\hat{x}=W_x\Delta x$, $W_b$ and $W_x$ being wavelet transform matrices for b and $\Delta x$ respectively; then performing Schur decomposition on the equation $\hat{K}_a\Delta\hat{x}_a=\hat{b}_a$, and letting the i-th level subsystem after decomposition be $\tilde{K}_{a(i,j)}\Delta\tilde{x}_{a(i,j)}=\tilde{b}_{a(i,j)}$, where $\tilde{K}_{a(i,j)}$ and $\tilde{b}_{a(i,j)}$ represent the j-th term at the i-th level in Schur decomposition.

5) letting $i=R-1$ and letting $j=1, 2, \ldots, 2^i$ and cyclically solving the equations $\tilde{K}_{a(i+1,2j)}\Delta\tilde{x}_{a(i+1,2j)}=\tilde{b}_{a(i+1,2j)}$ and $\tilde{K}_{a(i+1,2j-1)}\Delta\tilde{x}_{a(i+1,2j-1)}=\tilde{b}_{a(i+1,2j-1)}$, R representing the level number of decomposition; letting $i=R-1, \ldots, 1, 0$ and $j=1, 2, \ldots, 2^i$ and cyclically solving the equation $\Delta\tilde{x}_{a(i,j)}=\Gamma_{(i,j)}\Delta\tilde{x}_{a(i+1,2j-1)}+\Psi_{(i,j)}\Delta\tilde{x}_{a(i+1,2j)}$ to obtain the solution $\Delta\hat{x}_{a(i,j)}$; in which $\Delta\hat{x}_{a(i+1,2j-1)}$ and $\Delta\hat{x}_{a(i+1,2j)}$ are respectively the projection of $\Delta\hat{x}_{a(i,j)}$ in two subspaces, the base of which consists of the column vectors of $\Gamma_{(i,j)}$ and $\Psi_{(i,j)}$ respectively, where $\tilde{K}_{a(i+1,2j)}=\tilde{K}_{a(i,j)22}-\tilde{K}_{a(i,j)21}\tilde{K}_{a(i,j)11}^{-1}\tilde{K}_{a(i,j)12}$,
$\tilde{K}_{a(i,j)11}=\Gamma_{(i,j)}^T\tilde{K}_{a(i,j)}\Gamma_{(i,j)}$, $\tilde{K}_{a(i,j)12}=\Gamma_{(i,j)}^T\tilde{K}_{a(i,j)}\Psi_{(i,j)}$,
$\tilde{K}_{a(i,j)21}=\Psi_{(i,j)}^T\tilde{K}_{a(i,j)}\Gamma_{(i,j)}$, $\tilde{K}_{a(i,j)22}=\Gamma_{(i,j)}^T\tilde{K}_{a(i,j)}\Psi_{(i,j)}$,
$\tilde{b}_{a(i+1,2j)}=\Psi_{(i,j)}^T\tilde{b}_{a(i,j)}-\tilde{K}_{a(i,j)21}\tilde{K}_{a(i,j)11}^{-1}\Gamma_{(i,j)}^T\tilde{b}_{a(i,j)}$,
$\tilde{K}_{a(i+1,2j-1)}=\tilde{K}_{a(i,j)11}-\tilde{K}_{a(i,j)12}\tilde{K}_{a(i,j)22}^{-1}\tilde{K}_{a(i,j)21}$,
$\tilde{b}_{a(i+1,2j-1)}=\Gamma_{(i,j)}^T\tilde{b}_{a(i,j)}-\tilde{K}_{a(i,j)12}\tilde{K}_{a(i,j)22}^{-1}\Psi_{(i,j)}^T\tilde{b}_{a(i,j)}$.

6) performing zero-fill extension on $\Delta\tilde{x}_{a(0,1)}$ to obtain an initial solution, i.e., $$\Delta\hat{x}^{(0)} = \left[\Delta\tilde{x}_{a(0,1)}^T, 0^T\right]^T$$

and calculating the equation $K\Delta x=b$ by using the initial solution $\Delta x^{(0)}=W_x^T\Delta\hat{x}^{(0)}$; performing iteration calculation of the absorption coefficient to be reconstructed x, i.e., $x=x+\Delta x$; and calculating the objective function value according to $\psi(x)=\|y-\Phi_m(x)\|$, where y represents the measurement data.

7) if the objective function value is greater than a preset threshold ε, proceeding to the Step 2); otherwise ending the iterative calculation and obtaining the final absorption coefficient to be reconstructed x.

According to the present invention, in solving the inverse problem of fluorescence molecular tomography reconstruction, the reconstruction speed and the reconstruction quality can be improved for fluorescence molecular tomography through wavelet and Schur decomposition.

First Embodiment

In this embodiment, a reconstruction method of fluorescence molecular tomography based on a second-order sensitivity matrix is used to reconstruct a single target body model and is compared with the method of reconstruction by direct solution in terms of performance.

Figure 2:
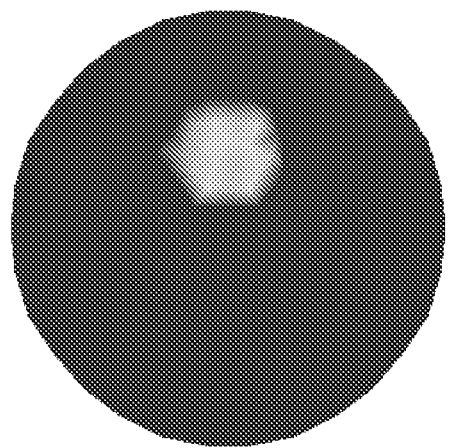
FIG. 2 is a diagram of a single target body simulated model according to a first embodiment of the present invention.

First a simulated model including a single target body as shown in FIG. 2 is to be reconstructed. 30 detectors and 4 light sources are distributed evenly around the model, and a discrete grid of finite elements includes 212 elements. Table 1 lists the distribution of optical parameters in a single target body simulated model.

TABLE 1

| Waveband of excitation light | $\mu_{aef}$ (mm$^{-1}$) | $\mu_{aei}$ (mm$^{-1}$) | $\mu_{se}'$ (mm$^{-1}$) |
|---|---|---|---|
| Target | 0.6 | 0.02 | 0.18 |
| Background | 0.05 | 0.02 | 0.18 |
| Waveband of fluorescent light | $\mu_{amf}$ (mm$^{-1}$) | $\mu_{ami}$ (mm$^{-1}$) | $\mu_{sm}'$ (mm$^{-1}$) |
| Target | 0.06 | 0.01 | 0.12 |
| Background | 0.005 | 0.01 | 0.12 |

Figure 3:
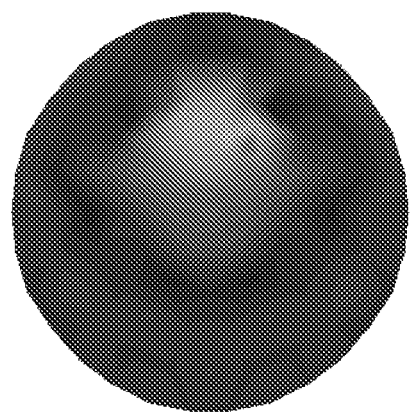
FIG. 3 is a diagram showing comparison of the reconstruction result for a single target body between the method of direct solution and the reconstruction method of the present invention according to the first embodiment of the present invention.
Figure 3:
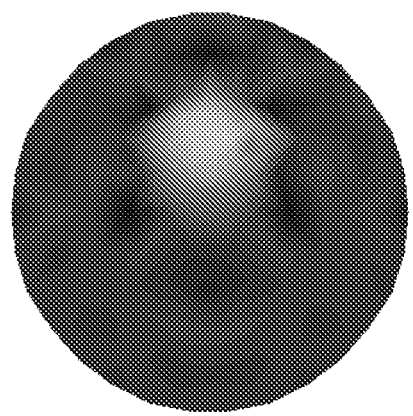

FIG. 3(a) shows the reconstruction result for a single target body based on the method of direct solution and FIG. 3(b) shows the reconstruction result for a single target body based on the present invention. For further quantitative evaluation of the reconstruction result, a mean square error is introduced and is calculated as $$MSE = \frac{1}{N}\sum_{i=1}^{N}[x^{act}(i) - x^{rec}(i)]^2,$$

where N represents the number of nodes in the imaging area, and $x^{rec}$ and $x^{act}$ represent the reconstruction result and the actual value. Table 2 lists the performance indexes of the different reconstruction methods.

TABLE 2

| Method | The present invention | Method of direct solution |
|---|---|---|
| Calculation time (s) | 141 | 210 |
| MSE | $3.903 \times 10^{-4}$ | $4.597 \times 10^{-4}$ |

As can be seen from Table 2, compared with the method of direct solution, the reconstruction method of the present invention requires significantly less calculation time, and the MSE of the method of the present invention is lower than that of the method of direct solution, which shows better reconstruction quality.

Second Embodiment

In this embodiment, a reconstruction method of fluorescence molecular tomography based on a second-order sensitivity matrix is used to reconstruct a dual target body model and is compared with the method of reconstruction by direct solution in terms of performance.

Figure 4:
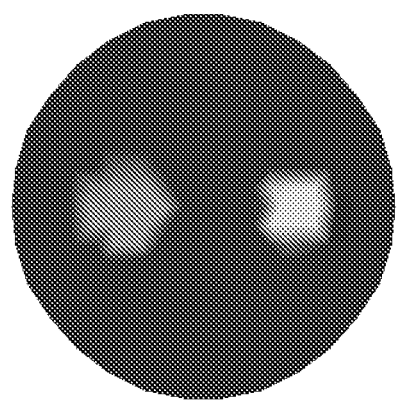
FIG. 4 is a diagram of a dual target body simulated model according to a second embodiment of the present invention.

A simulated model including dual target bodies as shown in FIG. 4 is to be reconstructed. 30 detectors and 4 light sources are distributed evenly around the model, and a discrete grid of finite elements includes 264 elements. Table 3 lists the distribution of optical parameters in a dual target body simulated model.

TABLE 3

| Waveband of excitation light | $\mu_{aef}$ (mm$^{-1}$) | $\mu_{aei}$ (mm$^{-1}$) | $\mu_{se}'$ (mm$^{-1}$) |
|---|---|---|---|
| Target | 0.4, 0.6 | 0.02 | 0.18 |
| Background | 0.05 | 0.02 | 0.18 |
| Waveband of fluorescent light | $\mu_{amf}$ (mm$^{-1}$) | $\mu_{ami}$ (mm$^{-1}$) | $\mu_{sm}'$ (mm$^{-1}$) |
| Target | 0.04, 0.06 | 0.01 | 0.12 |
| Background | 0.005 | 0.01 | 0.12 |

Figure 5:
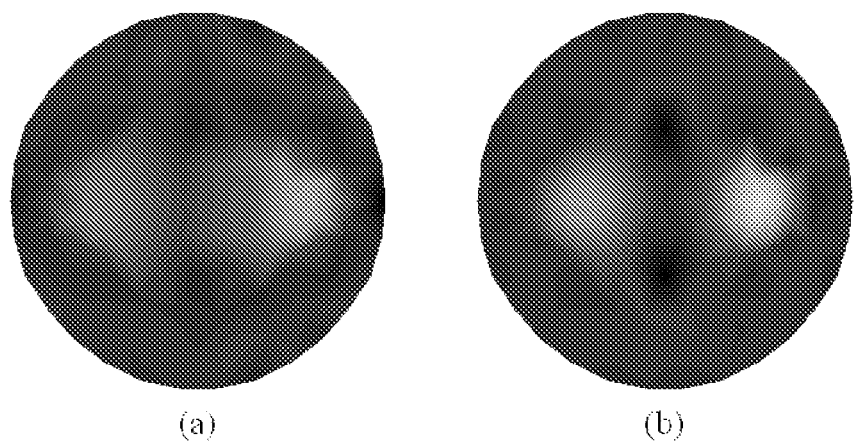
FIG. 5 is a diagram showing comparison of the reconstruction result for dual target bodies between the method of direct solution and the reconstruction method of the present invention according to the second embodiment of the present invention.

FIG. 5(a) shows the reconstruction result for dual target bodies based on the method of direct solution and FIG. 5(b) shows the reconstruction result for dual target bodies based on the present invention. For further quantitative evaluation of the reconstruction result, a mean square error is introduced and is calculated as $$MSE = \frac{1}{N}\sum_{i=1}^{N}[x^{act}(i) - x^{rec}(i)]^2,$$

where N represents the number of nodes in the imaging area, and $x^{rec}$ and $x^{act}$ represent the reconstruction result and the actual value. Table 4 lists the performance indexes of different reconstruction methods.

TABLE 4

| Method | The present invention | The method of direct solution |
|---|---|---|
| Calculation time (s) | 212 | 298 |
| MSE | $4.517 \times 10^{-4}$ | $5.081 \times 10^{-4}$ |

As can be seen from Table 4, compared with the method of direct solution, the reconstruction method of the present invention requires significantly less calculation time in reconstruction of dual target bodies, and the MSE of the method of the present invention is lower than that of the method of direct solution, showing better reconstruction quality, which evidently means that the method of the present invention exhibits higher speed and better imaging quality even in multi target reconstruction.

In summary, as can be known from the experimental results:

compared with the method based on direct solution of the matrix equation, the reconstruction method based on wavelet and Schur decomposition can effectively reduce the scale of the matrix of the system and consequently reduce the calculation cost of the inverse problem, better reconstruct the structure of the target body, and effectively improve the speed and accuracy of fluorescence molecular tomography reconstruction.

The present invention further provides a reconstruction system of fluorescence molecular tomography based on wavelet and Schur decomposition that adopts the reconstruction method described above for fluorescence molecular tomography. This system specifically includes:

a transform unit configured to transform the inverse problem in fluorescence molecular tomography into a linear matrix equation; and a calculation unit configured to solve the linear matrix equation and update reconstruction parameters iteratively using the obtained solution to obtain a final reconstruction result;

in which, in the process of solution of the linear matrix equation, wavelet transform is performed on the linear matrix equation to obtain an overview matrix equation, Schur decomposition is performed on the overview matrix equation to obtain a subsystem with a reduced number of conditions, and the linear matrix equation is calculated using the solution of the subsystem.

That is, fluorescence molecular tomography reconstruction is done by the following steps in the system:

initializing the absorption coefficient to be reconstructed x;

obtaining predicted photon density $\Phi_m(x)$ based on a forward model;

calculating the matrices K and b;

performing wavelet-Schur decomposition on the equation $K\Delta x = b$ and letting the i-th level subsystem after decomposition be $\tilde{K}_{a(i,j)} \Delta \tilde{x}_{a(i,j)} = \tilde{b}_{a(i,j)}$;

letting i=R−1 and letting j=1, 2, . . . , $2^i$ and cyclically solving the equations $\tilde{K}_{a(i+1,2j)} \Delta \tilde{x}_{a(i+1,2j)} = \tilde{b}_{a(i+1,2j)}$ and $\tilde{K}_{a(i+1,2j-1)} \Delta \tilde{x}_{a(i+1,2j-1)} = \tilde{b}_{a(i+1,2j-1)}$, R representing the level number of decomposition; letting i=R−1, . . . , 1, 0 and j=1, 2, . . . , $2^i$ and cyclically solving the equation $\Delta \tilde{x}_{a(i,j)} = \Gamma_{(i,j)} \Delta \tilde{x}_{a(i+1,2j-1)} + \Psi_{(i,j)} \Delta \tilde{x}_{a(i+1,2j)}$ to obtain the solution $\Delta \tilde{x}_{a(i,j)}$;

performing zero-fill extension on $\Delta \tilde{x}_{a(0,1)}$ to obtain an initial solution, i.e., $$\Delta \hat{x}^{(0)} = \left[ \Delta \tilde{x}_{a(0,1)}^T, 0^T \right]^T$$

and calculating the equation $K\Delta x = b$ by using the initial solution $\Delta x^{(0)} = W_x^T \Delta \hat{x}^{(0)}$; performing iteration calculation of the absorption coefficient to be reconstructed x, i.e., x=x+$\Delta$x; and calculating the objective function value; and if the objective function value is greater than a preset threshold $\varepsilon$, continuing with calculation; otherwise ending the iterative calculation and obtaining the final absorption coefficient to be reconstructed x.

Principle: The most important characteristic of wavelet transform is its capability to mine important information and neglect less important information. With Schur complement decomposition, the resultant subsystem has a reduced number of conditions, so that at given accuracy, the speed of solution of matrix equation is substantially increased for the system.

An image processing apparatus includes a memory, a processor and a computer grogram stored in the memory and executable on the processor. The processor, when executing the program, performs the steps of the method described above.

A processor is configured to execute a program which, when executed, performs the method described above.

The present application has been described with reference to flowcharts and/or block diagrams of methods, devices (systems), and computer program products according to embodiments of the present application. It should be understood that each flow and/or block in a flowchart and/or block diagram, and combinations of flows and/or blocks in a flowchart and/or block diagram can be implemented by computer program instructions. These computer program instructions may be provided to the processor of a general-purpose computer, a special-purpose computer, an embedded processor or other programmable data processing apparatus to produce a machine, so that the instructions executed by the processor of the computer or other programmable data processing apparatus produce means for implementing the functions specified in one or more flows in a flowchart and/or one or more blocks in a block diagram.

These computer program instructions can also be stored in a computer-readable memory that can direct a computer or other programmable data processing apparatus to operate in a specific way, so that the instructions stored in the computer-readable memory produce an article of manufacture including instruction means that implement the functions specified in one or more flows in a flowchart and/or one or more blocks in a block diagram.

These computer program instructions can also be loaded on a computer or other programmable data processing apparatus, so that a series of operation steps are executed on the computer or other programmable equipment to produce a computer-implemented process, so that the instructions executed on the computer or other programmable apparatus provide steps for implementing the functions specified in one or more flows in a flowchart and/or one or more blocks in a block diagram.

The embodiments described above are only preferred embodiments for fully explaining the present invention, and the scope of protection of the present invention is not limited thereto. Equivalent substitutions or changes made by those skilled in the art on the basis of the present invention shall fall within the scope of protection of the present invention. The scope of protection of the invention is defined by the claims.

What is claimed is:

1. A reconstruction method of fluorescence molecular tomography based on wavelet and Schur decomposition, comprising steps of:

generating, by a processor of the fluorescence molecular tomography imaging system, a linear matrix equation representing an inverse problem of fluorescence molecular tomography from measured data acquired by a detector of the fluorescence molecular tomography imaging system;

solving, by the processor, the linear matrix equation and updating reconstruction parameters iteratively using an obtained solution to obtain a final reconstruction result;

wherein in the process of solving the linear matrix equation, wavelet transform is performed on the linear matrix equation to obtain an overview matrix equation, Schur decomposition is performed on the overview matrix equation to obtain a subsystem with a reduced number of conditions, and the linear matrix equation is calculated using the solution of the subsystem.

2. The reconstruction method of fluorescence molecular tomography based on wavelet and Schur decomposition of claim 1, wherein the solving the linear matrix equation specifically comprises steps of:
- S01: for the linear matrix equation $K\Delta x=b$, calculating the matrices K and b;
- S02: performing wavelet transform on $K\Delta x=b$ to obtain an overview matrix equation $\hat{K}_a \Delta \hat{x}_a = \hat{b}_a$, where $\hat{K}=W_b K W_x^T$, $\hat{b}=W_b b$, and $\Delta \hat{x}=W_x \Delta x$, $W_b$ and $W_x$ being wavelet transform matrices for b and $\Delta x$ respectively;
- S03: performing Schur decomposition on $\hat{K}_a \Delta \hat{x}_a = \hat{b}_a$, and letting the i-th level subsystem after decomposition be $\tilde{K}_{a(i,j)} \Delta \tilde{x}_{a(i,j)} = \tilde{b}_{a(i,j)}$, where $\tilde{K}_{a(i,j)}$ and $\tilde{b}_{a(i,j)}$ represent the j-th term at the i-th level in Schur decomposition;
- S04: letting i=R−1 and letting j=1, 2, ..., $2^i$ and cyclically solving the equations $\tilde{K}_{a(i+1,2j)} \Delta \tilde{x}_{a(i+1,2j)} = \tilde{b}_{a(i+1,2j)}$ and $\tilde{K}_{a(i+1,2j-1)} \Delta \tilde{x}_{a(i+1,2j-1)} = \tilde{b}_{a(i+1,2j-1)}$, R representing the level number of decomposition; letting i=R−1, ..., 1, 0 and j=1, 2, ..., $2^i$ and cyclically solving the equation $\Delta \tilde{x}_{a(i,j)} = \Gamma_{(i,j)} \Delta \tilde{x}_{a(i+1,2j-1)} + \Psi_{(i,j)} \Delta \tilde{x}_{a(i+1,2j)}$ to obtain the solution $\Delta \tilde{x}_{a(i,j)}$;
- S05: performing zero-fill extension on $\Delta \tilde{x}_{a(0,1)}$ to obtain an initial solution, i.e., $$\Delta \hat{x}^{(0)} = \left[ \Delta \tilde{x}_{a(0,1)}^T, 0^T \right]^T$$

and calculating the equation $K\Delta x=b$ by using the initial solution $\Delta x^{(0)} = W_x^T \Delta \hat{x}^{(0)}$ to obtain the solution $\Delta x$.

3. The reconstruction method of fluorescence molecular tomography based on wavelet and Schur decomposition of claim 2, wherein in the Step S01, the matrices K and b are calculated based on $K=(J^T J+\lambda I)$ and $b=J^T \Delta y$, where $\lambda$ represents the regularization parameter, I represents the identity matrix, $\Delta y$ represents the residual between the predicted value and the measured value and J represents the sensitivity matrix:

$$J = \begin{bmatrix} \frac{\partial y_1}{\partial x_1} & \cdots & \frac{\partial y_1}{\partial x_N} \\ \vdots & \ddots & \vdots \\ \frac{\partial y_M}{\partial x_1} & \cdots & \frac{\partial y_M}{\partial x_N} \end{bmatrix}.$$

4. The reconstruction method of fluorescence molecular tomography based on wavelet and Schur decomposition of claim 2, wherein in the Step S04, $\Delta \tilde{x}_{a(i+1,2j-1)}$ and $\Delta \tilde{x}_{a(i+1,2j)}$ are respectively the projection of $\Delta \tilde{x}_{a(i,j)}$ in two subspaces, the base of which consists of the column vectors of $\Gamma_{(i,j)}$ and $\Psi_{(i,j)}$ respectively, where $\tilde{K}_{a(i+1,2j)} = \tilde{K}_{a(i,j)22} - \tilde{K}_{a(i,j)21} \tilde{K}_{a(i,j)11}^{-1} \tilde{K}_{a(i,j)12}$, $\tilde{K}_{a(i,j)11} = \Gamma_{(i,j)}^T \tilde{K}_{a(i,j)} \Gamma_{(i,j)}$, $\tilde{K}_{a(i,j)12} = \Gamma_{(i,j)}^T \tilde{K}_{a(i,j)} \Psi_{(i,j)}$, $\tilde{K}_{a(i,j)21} = \Psi_{(i,j)}^T \tilde{K}_{a(i,j)} \Gamma_{(i,j)}$, $\tilde{K}_{a(i,j)22} = \Gamma_{(i,j)}^T \tilde{K}_{a(i,j)} \Psi_{(i,j)}$, $\tilde{b}_{a(i+1,2j)} = \Psi_{(i,j)}^T \tilde{b}_{a(i,j)} - \tilde{K}_{a(i,j)21} \tilde{K}_{a(i,j)11}^{-1} \Gamma_{(i,j)}^T \tilde{b}_{a(i,j)}$, $\tilde{K}_{a(i+1,2j-1)} = \tilde{K}_{a(i,j)11} - \tilde{K}_{a(i,j)12} \tilde{K}_{a(i,j)22}^{-1} \tilde{K}_{a(i,j)21}$, and $\tilde{b}_{a(i+1,2j-1)} = \Gamma_{(i,j)}^T \tilde{b}_{a(i,j)} - \tilde{K}_{a(i,j)12} \tilde{K}_{a(i,j)22}^{-1} \Gamma_{(i,j)}^T \tilde{b}_{a(i,j)}$.

5. The reconstruction method of fluorescence molecular tomography based on wavelet and Schur decomposition of claim 2, wherein iterative update is made to the reconstruction parameters by using the obtained solution, that is, iterative calculation is made to the absorption coefficient to be reconstructed x, i.e., $x=x+\Delta x$.

6. The reconstruction method of fluorescence molecular tomography based on wavelet and Schur decomposition of claim 5, wherein predicted photon density $\Phi_m(x)$ is obtained based on a forward model and an objective function $\psi(x) = \|y - \Phi_m(x)\|$ is created, where y represents the measurement data, and an objective function value is calculated; and
- if the objective function value is greater than a preset threshold 8, then solving the linear matrix equation is continued; otherwise the iterative update is ended and the final absorption coefficient to be reconstructed x is obtained.

7. The reconstruction method of fluorescence molecular tomography based on wavelet and Schur decomposition of claim 1, wherein within a finite element frame, the forward model is expressed as the matrix equations $A_e \Phi_e = S_e$ and $A_m \Phi_m = S_m$, where $S_{e,m}$ represents a light source, the stiffness matrices $A_e$ and $A_m$ are calculated according to the formula $$a_{\Omega_h}(u_i, u_j)_{e,m} = \int\!\!\int_{\Omega_h} D_{e,m} \nabla u_i \cdot \nabla u_j d\Omega + \int\!\!\int_{\Omega_h} k_{e,m} u_i u_j d\Omega + \int_{\Gamma_h} b_{e,m} u_i u_j ds,$$

where $a_{\Omega_h}(u_i, u_j)$ represents the element in the i-th row and j-th column of the unit stiffness matrix; $\nabla$ represents a gradient, $\Omega_h$ is an imaging area, $\Gamma_h$ is a boundary of the imaging area, $u_i (i=1, ..., N)$ is a base function of a space node, N is the number of base functions of the node;

$$D_e = \frac{1}{3(\mu_{aei} + \mu_{aef} + \mu'_{se})}$$

and $$D_m = \frac{1}{3(\mu_{ami} + \mu_{amf} + \mu'_{sm})}$$

represent diffusion coefficients, the subscript e represents an excitation light, the subscript m represents a fluorescent light;

$$k_e = \frac{i\omega}{c} + \mu_{aei} + \mu_{aef}$$

and $$k_m = \frac{i\omega}{c} + \mu_{ami} + \mu_{amf}$$

represent decay coefficients, $b_e$ and $b_m$ represent the Robin boundary coefficients; $\mu_{aei}$ and $\mu_{ami}$ are absorption coefficients of chromatophores, $\mu_{aef}$ and $\mu_{amf}$ are absorption coefficients of fluorophores, $\mu'_{se}$ and $\mu'_{sm}$ are isotropic scattering coefficients, c is the light velocity, $\omega$ represents an angular frequency, and $i=\sqrt{-1}$.

8. A reconstruction system of fluorescence molecular tomography based on wavelet and Schur decomposition, adopting the reconstruction method of claim 1 for fluorescence molecular tomography.

9. An image processing apparatus comprising a memory, a processor and a computer grogram stored in the memory and executable on the processor, wherein the processor, when executing the program, performs the steps of the method of claim 1.

10. A processor configured to execute a program, wherein the program, when executed, performs the method of claim 1.

* * * * *